United States Patent
Nam et al.

(10) Patent No.: US 7,930,467 B2
(45) Date of Patent: Apr. 19, 2011

(54) METHOD OF CONVERTING A HYBRID HARD DISK DRIVE TO A NORMAL HDD

(75) Inventors: Hye-jeong Nam, Seongnam-si (KR); Jae-sung Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 696 days.

(21) Appl. No.: 11/936,147

(22) Filed: Nov. 7, 2007

(65) Prior Publication Data
US 2008/0222353 A1    Sep. 11, 2008

(30) Foreign Application Priority Data
Mar. 8, 2007  (KR) .................. 10-2007-0023167

(51) Int. Cl.
*G06F 12/00*    (2006.01)
(52) U.S. Cl. .. 711/103; 711/112; 711/113; 711/E12.083
(58) Field of Classification Search .................. 711/113, 711/103, 112, E12.103
See application file for complete search history.

(56) References Cited

U.S. PATENT DOCUMENTS

| | | | |
|---|---|---|---|
| 6,442,724 B1 * | 8/2002 | Augarten ...................... | 714/738 |
| 2005/0114728 A1 * | 5/2005 | Aizawa et al. ................... | 714/6 |
| 2008/0091876 A1 * | 4/2008 | Fujibayashi et al. .......... | 711/113 |

FOREIGN PATENT DOCUMENTS

| | | |
|---|---|---|
| JP | 06309896 A | 11/1994 |
| JP | 09134594 A | 5/1997 |
| KR | 100205006 B1 | 3/1999 |
| KR | 100492793 B1 | 5/2005 |

OTHER PUBLICATIONS

Machine Translation, Japanese Patent Laid-Open Publication No. 2004-164193.*

* cited by examiner

*Primary Examiner* — Reginald G Bragdon
*Assistant Examiner* — Victor W Wang
(74) *Attorney, Agent, or Firm* — Volentine & Whitt, PLLC

(57) ABSTRACT

A method of converting a hybrid hard disk drive (HDD) to a normal HDD when a system is powered on depending on whether the total number of defective blocks in a non-volatile cache (NVC) exceeds a predetermined threshold. The method of converting a hard disk drive (HDD) from a hybrid HDD to a normal HDD where the HDD has a normal hard disk and a non-volatile cache includes the steps of determining whether a mode conversion flag is enabled during a power-on period. When the mode conversion flag is enabled, operating the HDD as a normal HDD. When the mode conversion flag is disabled, determining whether an operating mode of the HDD is a normal mode or a hybrid mode. When the operating mode of the HDD is in the normal mode, the HDD operates as a normal HDD. A determination is made when the HDD is in the hybrid mode as to whether the total number of defective blocks in the non-volatile cache is greater than a predetermined threshold. The HDD is operated as a hybrid HDD when the total number of defective blocks is not greater than the threshold. The mode conversion flag is enabled and the HDD is operated as a hybrid HDD when the total number of defective blocks is greater than the threshold.

24 Claims, 10 Drawing Sheets

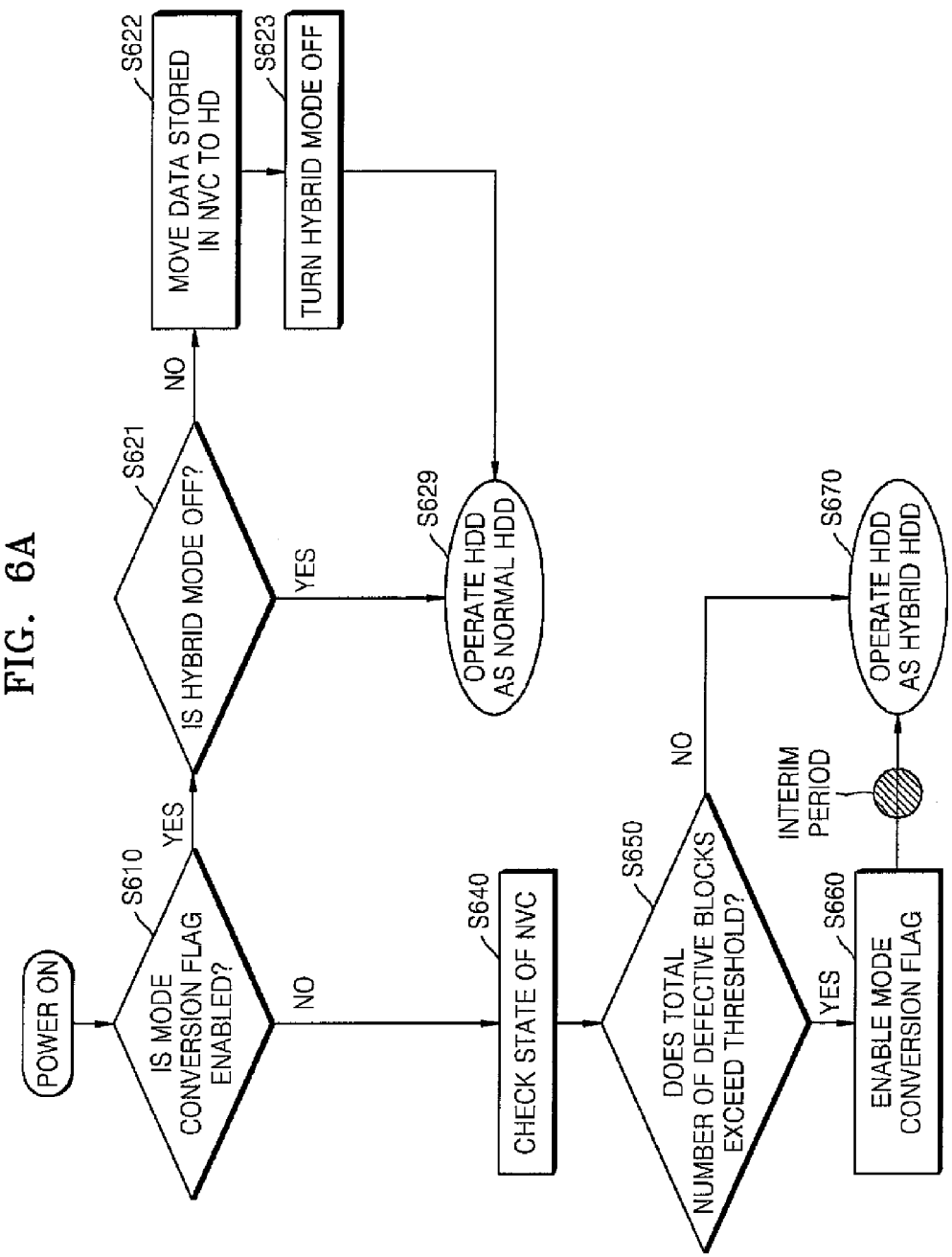

METHOD OF CONVERTING A HYBRID HARD DISK DRIVE TO A NORMAL HDD

CROSS-REFERENCE TO RELATED APPLICATION

This U.S. non-provisional application claims priority under 35 U.S.C. §119 of Korean Patent Application No. 10-2007-0023167 filed on Mar. 8, 2007, the entire contents of which are hereby incorporated by reference.

BACKGROUND OF THE INVENTION

1. Field of the Invention

The present invention relates to a method of converting a hybrid hard disk drive (HDD) to a normal HDD. More particularly, embodiments of the invention relate to a method of converting a hybrid HDD to a normal HDD when a system having the hybrid HDD is powered on depending on whether the total number of defective blocks in a non-volatile cache is greater than a predetermined threshold.

2. Discussion of Related Art

A hybrid hard disk drive (HDD) is a type of HDD that is a combination of a normal hard disk and a non-volatile cache (NVC). A spindle motor must be rotated at a predetermined speed in order to read a file from a normal hard disk, but the spindle motor need not be rotated in order to read a file from a NVC. Thus, it is possible to reduce a time required to boot the operating system or to access data stored therein by storing files or data files for booting the operating system in an NVC, such as flash memory, and reading them from the NVC. Also, as the spindle motor need not be rotated in order to read the files from the NVC, power consumption can be reduced.

FIG. 1 is a block diagram of a computer system 100 with a hybrid HDD 120. Computer system 100 includes a host 110 and hybrid HDD 120. Hybrid HDD 120 includes a normal hard disk 130 and NVC 140. The number of times data can be erased from a flash memory that is used as NVC 140 is limited.

FIG. 2 is a graph illustrating an error rate versus the number of erasing times that data is erased from a flash memory. Erasing a flash memory is performed in block units and data must be erased from a block before the block is programmed. When the number of erasing times exceeds a limited number of erasing times, the rate of error in a programming operation or an erasing operation increases exponentially. A block in which the number of erasing times is greater than the limited number of erasing times available may be considered a defective block. A wear leveling technique may be used to suppress the number of erasing times on a specific block from being significantly increased. This is done by dispersedly performing erasing operations on a plurality of blocks in order to prevent the erasing operation or a programming operation from being performed repeatedly on the same block. This delays the occurrence of a defective block.

In general, a flash memory includes spare blocks which are used to replace a defective block. However, when all spare blocks are used, it is difficult to expect normal operation of the flash memory. Accordingly, there is a need for a method of converting a hybrid HDD that utilizes both a normal hard disk and an NVC into a normal HDD that uses only the normal hard disk before the NVC 140 reaches its use limit.

SUMMARY OF THE INVENTION

The present invention provides a method of converting a hybrid hard disk drive (HDD) to a normal HDD when the system is powered on depending on whether the total number of defective blocks in a non-volatile cache (NVC) exceeds a predetermined threshold. In an exemplary embodiment, the method of converting a hard disk drive (HDD) from a hybrid HDD to a normal HDD where the HDD has a normal hard disk and a non-volatile cache includes determining whether a mode conversion flag is enabled during a power-on period. When the mode conversion flag is enabled, operating the HDD as a normal HDD. When the mode conversion flag is disabled, determining whether an operating mode of the HDD is in a normal mode or a hybrid mode. When the operating mode of the HDD is in the normal mode, the HDD is operated as a normal HDD. A determination is made when the HDD is in the hybrid mode as to whether the total number of defective blocks in the non-volatile cache is greater than a predetermined threshold. The HDD is operated as a hybrid HDD when the total number of the defective blocks is not greater than the threshold. The mode conversion flag is enabled and the HDD is operated as a hybrid HDD when the total number of defective blocks is greater than the threshold.

BRIEF DESCRIPTION OF THE DRAWINGS

FIG. 6A is a flowchart illustrating a method of converting a hybrid HDD into a normal HDD according to an embodiment of the present invention;

DESCRIPTION OF EMBODIMENTS

Figure 1:
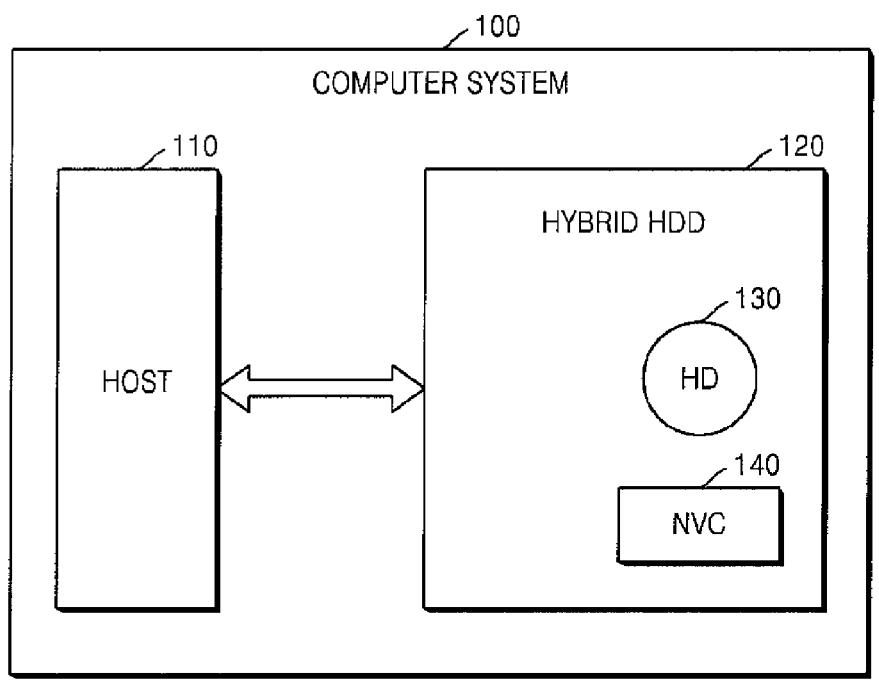
FIG. 1 is a block diagram of a computer system with a hybrid hard disk drive (HDD)
Figure 2:
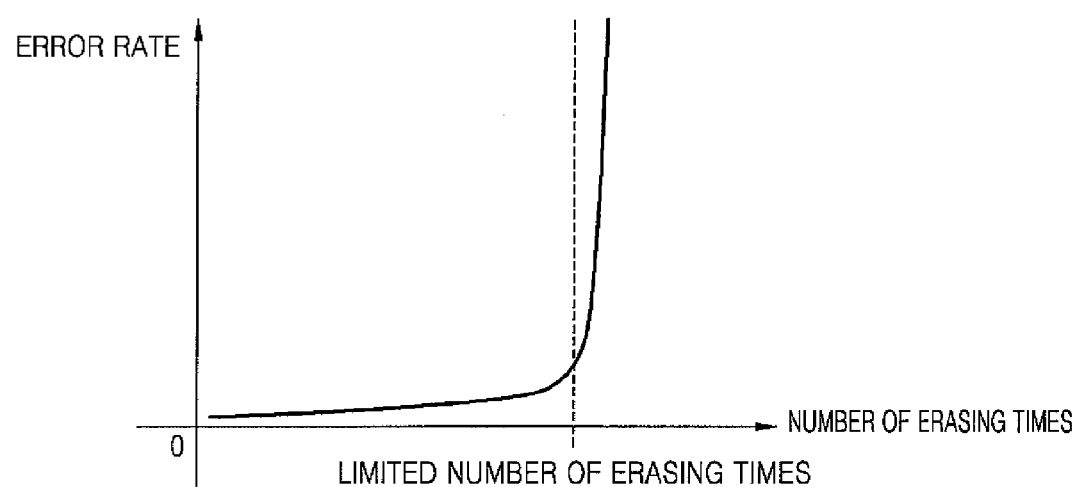
FIG. 2 is a graph illustrating an error rate versus the number of erasing times that data is erased from a flash memory.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Figure 3:
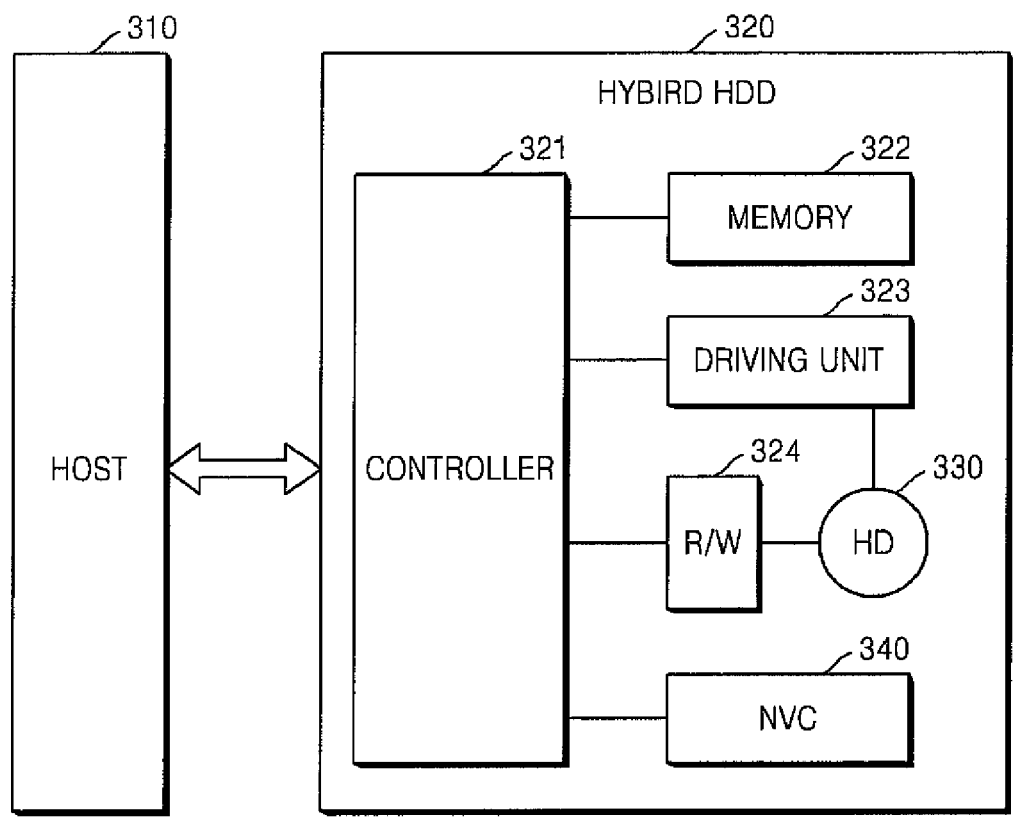
FIG. 3 is a block diagram illustrating the elements of a hybrid HDD according to an embodiment of the present invention.

FIG. 3 illustrates a block diagram of hybrid HDD 320 and host 310. Host 310 may be, for example, a computer system. Hybrid HDD 320 includes controller 321, memory 322, driving unit 323, read/write (R/W) unit 324, normal hard disk 330, and a non-volatile cache (NVC) 340. Controller 321 controls the overall operation of hybrid HDD 320 and allows hybrid HDD 320 to exchange data or commands with host 310. Memory 322 temporarily stores data or programs necessary to control the operation of controller 321. A method of converting a hybrid HDD into a normal HDD may be stored in the form of a program in memory 322. Driving unit 323 includes a voice coil driving unit that supplies current for driving a voice coil, and a spindle motor driving unit that drives a spindle motor. R/W unit 324 includes a pre-amplifier that amplifies data read from normal hard disk 330 and a write driver that amplifies data transmitted from host 310. Hybrid HDD 320 uses both the normal hard disk 330 and NVC 340 in a hybrid mode. In order to convert hybrid HDD 320 back into a normal HDD, NVC 340 is deactivated and controller 321 informs host 310 that NVC 340 is deactivated. Thereafter, only the normal hard disk 330 is used in a normal mode.

Figure 4A:
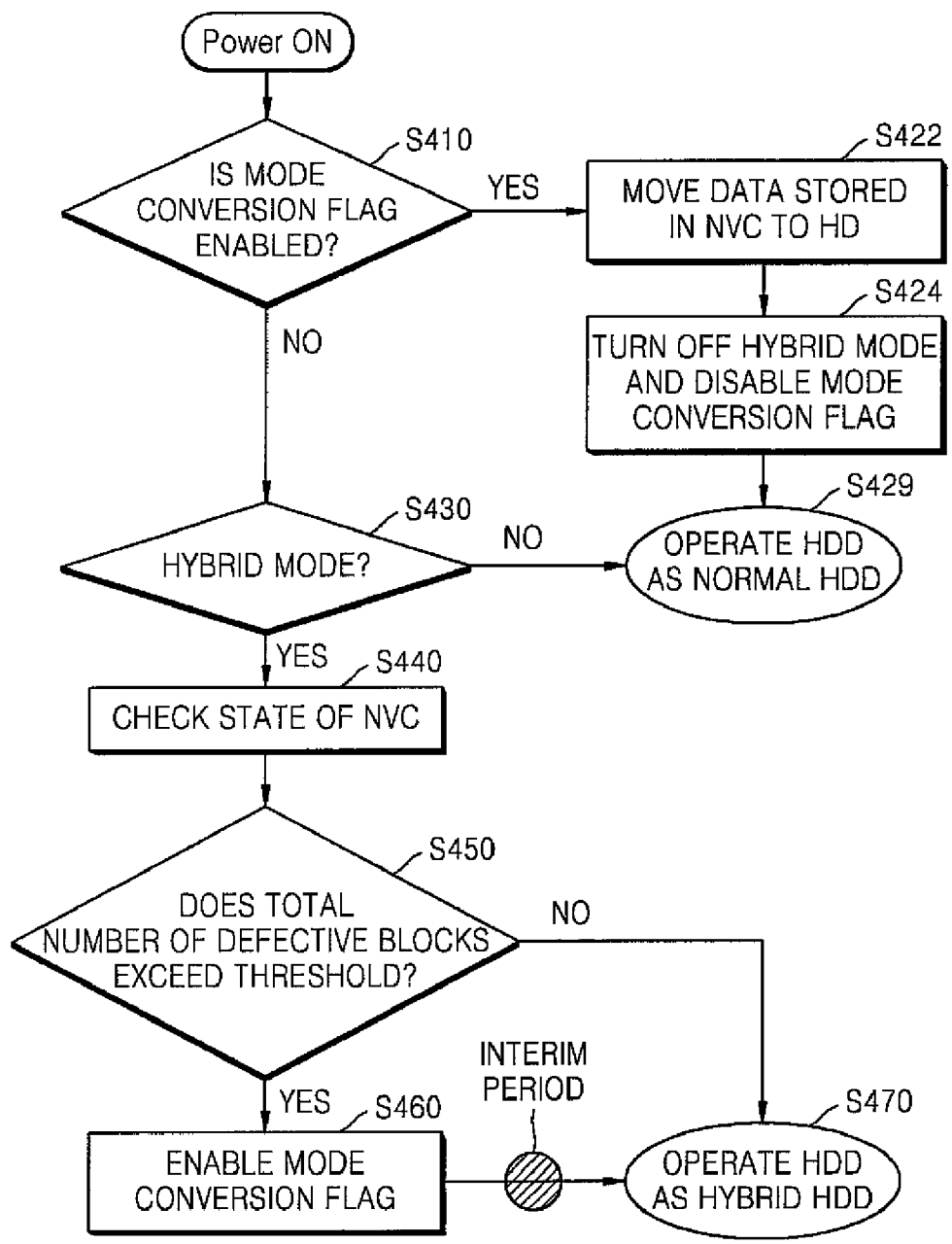
FIG. 4A is a flowchart illustrating a method of converting a hybrid HDD into a normal HDD according to an embodiment of the present invention.

FIG. 4A is a flowchart illustrating a method of converting a HDD from a hybrid HDD to a normal HDD in accordance with an embodiment of the invention. When a system with the HDD is powered on, a determination is made whether or not a mode conversion flag is enabled at step S410. This determines whether or not to convert the HDD from a hybrid HDD to a normal HDD. In particular, if the mode conversion flag is enabled, data stored in an NVC is moved to a normal hard disk at step S422 and the hybrid HDD is to be converted into a normal HDD or the hybrid HDD has been converted into the normal HDD. At step S424, the hybrid mode is turned off and the mode conversion flag is disabled and the HDD operates as a normal HDD (operation S429).

Figure 4B:
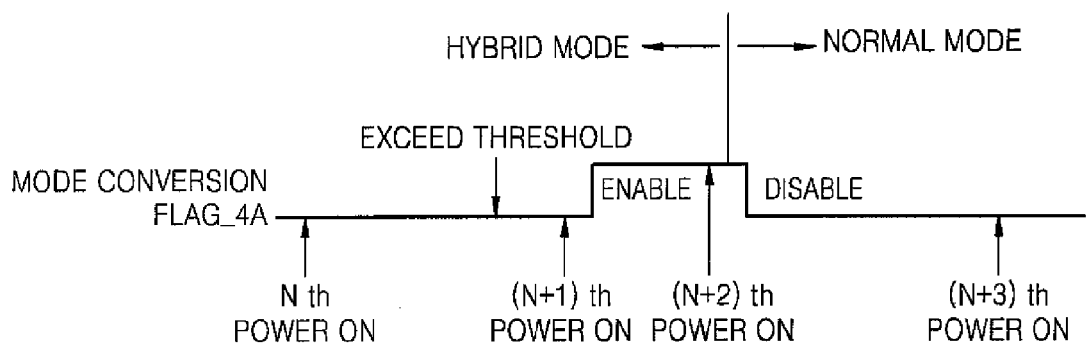
FIG. 4B illustrates the state of mode conversion flag when a hybrid HDD is converted into a normal HDD according to the method of FIG. 4A.

FIG. 4B illustrates the state of the mode conversion flag when the hybrid HDD is converted into the normal HDD. If the mode conversion flag is not enabled, a determination is made at step 430 whether the current HDD operating mode is a normal mode or a hybrid mode. If the HDD is not operating in the hybrid mode, then the method proceeds to step S429 and the HDD operates as a normal HDD. If the current HDD operating mode is the hybrid mode, the state of the NVC is checked at step S440. At step S450, a check is performed to determine if the total number of defective blocks in the NVC is greater than a predetermined threshold. The threshold is determined by the total number of spare blocks in the NVC. In particular, the threshold may be determined differently according to a defect management method for a flash memory used as an NVC.

The defect management method for a flash memory may be categorized as two types based on whether to allow use of the flash memory when the total number of defective blocks in the flash memory is greater than that of the spare blocks in the flash memory. In a first type of defect management method, if the total number of defective blocks is greater than that of spare blocks, the flash memory is not used any further. In a second type of defect management method, if the total number of defective blocks is greater than that of spare blocks, the flash memory is temporarily used while the total number of available valid blocks is reduced one by one.

If a flash memory managed according to the first type of defect management method is used as an NVC in a hybrid HDD, the threshold may be set to be a value obtained by subtracting a user margin from the total number of spare blocks. In this manner, it is possible to convert the hybrid HDD into a normal HDD before the total number of defective blocks becomes greater than that of the spare blocks in the flash memory hybrid HDD. That is, the hybrid HDD is converted into the normal HDD before the flash memory can be used any further.

If a flash memory managed according to the second type of defect management is used such as an NVC in a hybrid HDD, the threshold may be set as the total number of spare blocks. Even if the total number of defective blocks is greater than that of the spare blocks, the flash memory can be temporarily used by reducing the total number of available valid blocks one by one. This allows the HDD to temporarily operate in the hybrid mode. If it is determined in operation S450 that the total number of defective blocks is not greater than the threshold, the HDD operates as a hybrid HDD at step S470. If it is determined in operation S450 that the total number of the defective blocks is greater than the threshold, the mode conversion flag is enabled in step S460 and the HDD operates as a hybrid HDD at step S470. After the operation of a normal HDD has finished (step S429) or the hybrid HDD has finished its operation (step S470), the system having the HDD is powered off.

In order to guarantee stable operation of the system, the hybrid HDD is not converted directly into the normal HDD when the mode conversion flag is enabled at step S460. Instead, the HDD operates on an interim period basis as a hybrid HDD between when the mode conversion flag is enabled at step S460 and when the system is powered off after step S470. An "interim period" illustrated in FIGS. 4A, 5A, 6A, and 7A denotes the above interim state. Thereafter, when the system is again powered on, the hybrid HDD is converted to the normal HDD.

As illustrated in FIG. 4A, the mode conversion flag is enabled when the total number of the defective blocks is greater than the threshold (step S460) and is disabled when the current HDD operating mode is converted from a hybrid mode to a normal mode (step S424).

During an Nth power-on of the system having the HDD, if the mode conversion flag is disabled in step S410, the current HDD operating mode is in the hybrid mode (step S430), and the total number of defective blocks in the NVC is not greater than the threshold (steps S440 and S450), then the HDD operates as a hybrid HDD (step S470). In this case, during the operation of the hybrid HDD (step S470), the total number of defective blocks in the NVC becomes greater than the threshold and the system is powered off.

During an N+1th power-on of the system, if the mode conversion flag is disabled (step S410), the HDD operates in the hybrid mode (step S430), and the total number of defective blocks is greater than the threshold (steps S440 and S450), then the mode conversion flag is enabled (step S460) and the HDD operates on an interim period basis as a hybrid HDD (step S470). The system is then powered off.

During an N+2th power-on of the system, if the mode conversion flag is enabled (step S410), then the hybrid mode is turned "off" and the HDD operates as a normal HDD (step S429). If it is determined in step S410 that the mode conversion flag is enabled, then data stored in the NVC is moved to the normal hard disk (step S422). The hybrid mode is then turned "off" and the mode conversion flag is disabled (step S424). Then the HDD operates as a normal HDD (step S429) and the system is powered off. During an N+3th power-on of the system, if the mode conversion flag is disabled (step S410) and the HDD operating mode is in the normal mode (step S430), the HDD operates as a normal HDD (step S429).

Figure 5A:
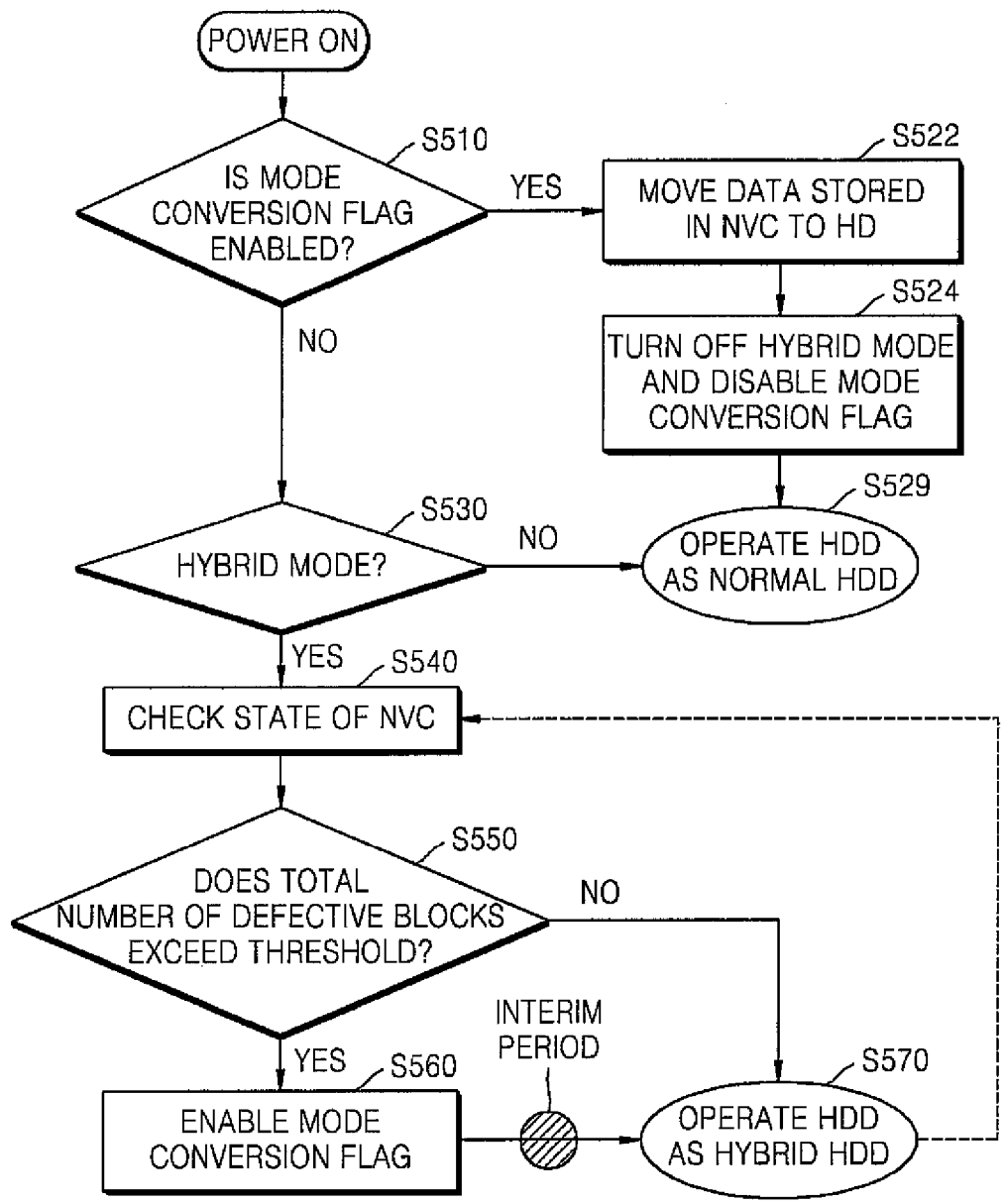
FIG. 5A is a flowchart illustrating a method of converting a hybrid HDD into a normal HDD according to an embodiment of the present invention.
Figure 5B:
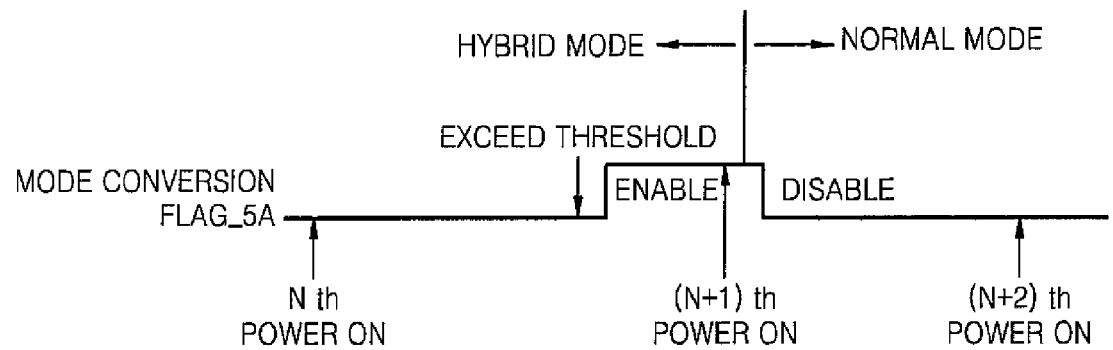
FIG. 5B illustrates the state of mode conversion flag when a hybrid HDD is converted into a normal HDD according to the method of FIG. 5A.

FIG. 5A is a flowchart illustrating a method of converting a HDD from a hybrid HDD to a normal HDD in accordance with an embodiment of the present invention. FIG. 5B illustrates a mode conversion flag state when a hybrid HDD is converted into a normal HDD according to the method of FIG. 5A. Steps S510, S522, S524, S529, S530, S540, S550, S560, and S570 of FIG. 5A correspond to operations S410, S422, S424, S429, S430, S440, S450, S460, and S470 of FIG. 4A respectively. Similarly, a mode conversion flag is enabled when the total number of defective blocks is greater than a predetermined threshold (step S560) and is disabled when the HDD operating mode is converted from a hybrid mode to a normal mode (step S524). However, the method illustrated in FIG. 5A further includes a loop back for determining again whether the total number of defective blocks in an NVC is greater than the threshold at steps S540 and S550 after the hybrid HDD operates (S570) and before the system is powered off. Thereafter, operation S560 or S570 is performed again according to the result of determining again whether the total number of defective blocks in an NVC is greater than the threshold at steps S540 and S550.

The difference between the methods of FIG. 5A and FIG. 4A is apparent from a comparison of FIG. 5B and FIG. 4B, which will be described with reference to FIG. 5B. During an Nth power-on of the system, if the mode conversion flag is disabled (step S510), the HDD is operating in a hybrid mode (step S530), and the total number of defective blocks in an NVC is not greater than a predetermined threshold (steps S540 and S550), then the HDD operates as a hybrid HDD (step S570). During operation of the hybrid HDD (step S570), the total number of defective blocks becomes greater than the threshold. A determination is made again as to whether the total number of defective blocks is greater than the threshold (steps S540 and S550) and the mode conversion flag is enabled when the total number of the defective blocks is greater than the threshold (step S560) and the HDD operates as a hybrid HDD on an interim basis (step S570). The system is then powered off.

During an N+1th power-on of the system, if the mode conversion flag is enabled (step S510) then the hybrid mode is turned "off" and the HDD operates as a normal HDD (step S529). If it is determined in step S510 that the mode conversion flag is enabled, data stored in the NVC is moved to the normal HDD at step S522, the hybrid mode is turned "off" at step S524 and the mode conversion flag is disabled at step S524. The HDD is operating as a normal HDD (step S529) and the system is then powered off. During an N+2th power-on of the system, if the mode conversion flag is disabled (step S510) and the HDD operating mode is in normal mode (step S530), then the HDD operates as a normal HDD (step S529).

Figure 6B:
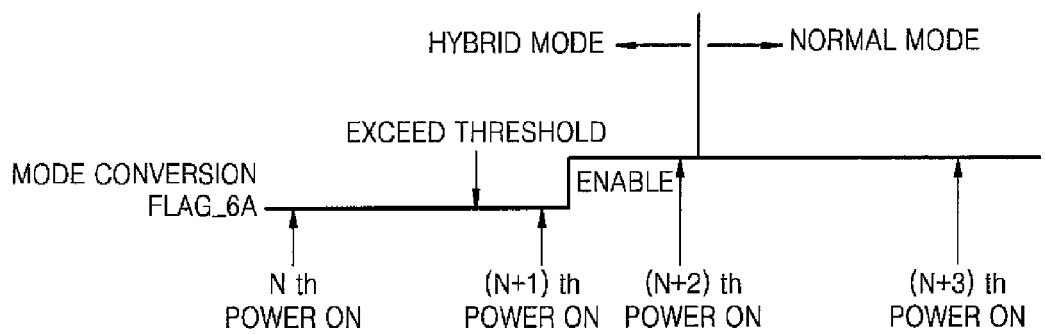
FIG. 6B illustrates the state of mode conversion flag when a hybrid HDD is converted into a normal HDD according to the method of FIG. 6A.

FIG. 6A is a flowchart illustrating a method of converting a HDD from a hybrid HDD to a normal HDD, according to another embodiment of the present invention. FIG. 6B illustrates the state of a mode conversion flag when the hybrid HDD is converted into a normal HDD according to the method of FIG. 6A. First, if a system having a HDD is powered on, step S610 determines whether a mode conversion flag is enabled. If the mode conversion flag is enabled, the HDD operates as a normal HDD at step S629. If the mode conversion flag is enabled, step S621 determines whether the hybrid mode is turned "off." If it is determined in step S621 that the hybrid mode is not turned "off", data stored in an NVC is moved to a normal hard disk at step S622, the hybrid mode is turned "off" at step S623, and the HDD operates as a normal HDD in step S629. If it is determined in step S621 that the hybrid mode is turned "off", the HDD operates directly as a normal HDD at step S629.

If it is determined in step S610 that the mode conversion flag is disabled, a determination is made whether the total number of defective blocks in the NVC is greater than a predetermined threshold (steps S640 and S650). As described above, the threshold may be set to be the total number of spare blocks in the NVC, or a value obtained by subtracting a user margin from the total number of spare blocks. If it is determined in step S650 that the total number of the defective blocks is not greater than the threshold, the HDD operates as a hybrid HDD in step S670. If the total number of defective blocks is greater than the threshold, the mode conversion flag is enabled at step S660 and the HDD operates as a hybrid HDD at step S670 on an interim basis. After the normal HDD has finished operation (step S629) or the hybrid HDD has finished operation (step S670), the system is powered off.

Unlike the embodiments described with reference to FIGS. 4A and 5A, the method of FIG. 6A illustrates that the mode conversion flag is enabled when the total number of defective blocks is greater than the threshold (step S660), and maintains the enabled state even when the HDD operating mode is converted from the hybrid mode to the normal mode at steps S623 and S629.

Referring to FIG. 6B, during an Nth power-on of the system, if the mode conversion flag is disabled (step S610) and the total number of the defective blocks in the NVC is not greater than the threshold (steps S640 and S650), then the HDD operates as a hybrid HDD at step S670. During the operation of the hybrid HDD (step S670), the total number of defective blocks becomes greater than the threshold and the system is powered off.

During an N+1th power-on of the system, if the mode conversion flag is disabled at step S610 and the total number of the defective blocks is greater than the threshold (steps S640 and S650), then the mode conversion flag is enabled at step S660 and the HDD operates as a hybrid HDD at step S670 on an interim basis. The system is then powered off.

During an N+2th power-on of the system, if the mode conversion flag is enabled at step S610 and the hybrid mode is not turned "off" (step S621), then the data stored in the NVC is moved to a normal hard disk at step S622, the hybrid mode is turned "off" (step S623), and the HDD operates as a normal HDD at step S629. The system is then powered off. During an N+3th power-on of the system, if the mode conversion flag is enabled at step S610 and the hybrid mode is "off" (step S621), then the HDD operates directly as a normal HDD at step S629.

Figure 7A:
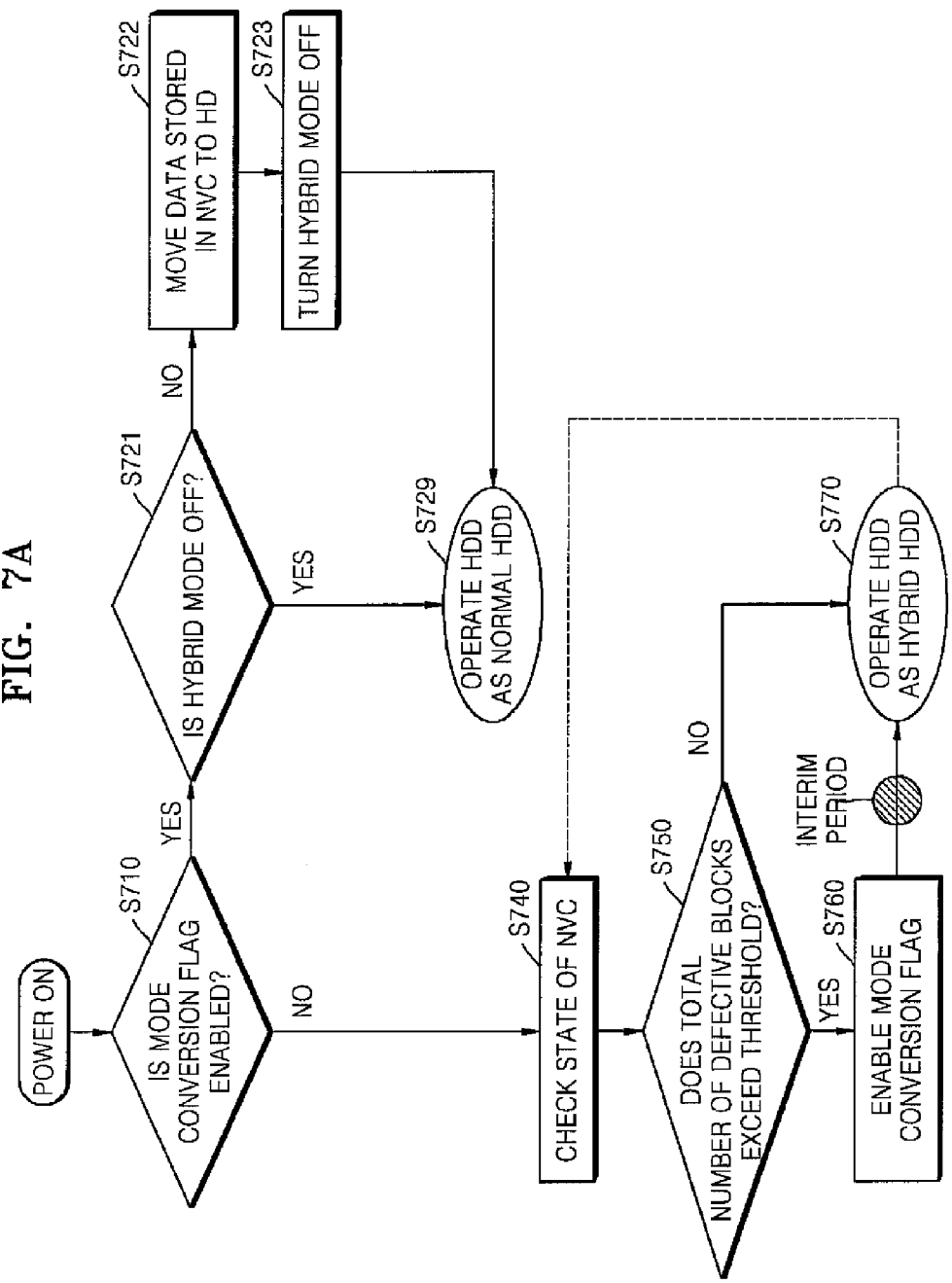
FIG. 7A is a flowchart illustrating a method of converting a hybrid HDD into a normal HDD according to an embodiment of the present invention.
Figure 7B:
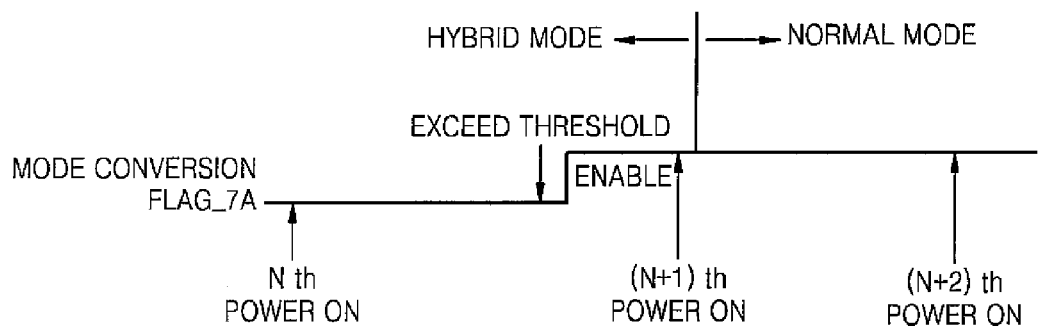
FIG. 7B illustrates the state of mode conversion flag when a hybrid HDD is converted into a normal HDD according to the method of FIG. 7A.

FIG. 7A is a flowchart illustrating a method of converting a hybrid HDD to a normal HDD according to another embodiment of the present invention. FIG. 7B illustrates the state of a mode conversion flag when the hybrid HDD is converted into a normal HDD according to the method of FIG. 7A. Operations S710, S721, S722, S723, S729, S740, S750, S760, and S770 illustrated in FIG. 7A correspond to operations S610, S621, S622, S623, S629, S640, S650, S660, and S670 respectively of FIG. 6A. The mode conversion flag is enabled when the total number of defective blocks is greater than a predetermined threshold in step S760. The conversion flag is also enabled when the HDD operating mode is converted from a hybrid mode to a normal mode at steps S723 and S729. However, unlike in the embodiment referenced in FIG. 6A, the method of FIG. 7A further includes the step of determining again whether the total number of defective blocks in the NVC is greater than the threshold at steps S740 and S750. If the total number of defective blocks has already been determined as not being greater than the threshold at step S750, a determination is made again after the hybrid HDD operates at step S770 and before the system is powered off. Steps S760 or S770 is performed again based on the result of determining whether the total number of defective blocks in the NVC is greater than the threshold.

The difference between the methods of FIG. 7A and FIG. 6A is apparent from a comparison of FIGS. 7B and 6B. In particular as referenced in FIG. 7B, during an Nth power-on of the system, if the mode conversion flag is disabled at step S710 and the total number of defective blocks in the NVC is not greater than the threshold from steps S740 and S750, then the HDD operates as a hybrid HDD at step S770. During the operation of the hybrid HDD at step S770, the total number of the defective blocks becomes greater than the threshold. Next, it is again determined whether the total number of defective blocks is greater than the threshold (steps S740 and S750). If the total number of defective blocks is greater than the threshold, the mode conversion flag is enabled at step S760 and the HDD operates as a hybrid HDD at step S770. The system is then powered off.

During an N+1th power-on of the system, if the mode conversion flag is enabled from step S710 and the hybrid mode is not turned "off" at step S721, data stored in an NVC is moved to a normal HDD at step S722. The hybrid mode is turned "off" at step S723 and the HDD operates as a normal HDD at step S729. During an N+2th power-on of the system, if the mode conversion flag is enabled at step S710 and the hybrid is turned "off" at step S721, then the HDD directly operates as a normal HDD in step S729. In this manner, it is possible to convert a hybrid HDD into a normal HDD before a flash memory used as an NVC in a hybrid HDD reaches its use limit.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

What is claimed is:

1. A method of converting a hard disk drive (HDD) from a hybrid HDD to a normal HDD, the HDD having a normal hard disk and a non-volatile cache, the method comprising:
    determining whether a mode conversion flag is enabled during a power-on period;
    operating the HDD as the normal HDD when the mode conversion flag is enabled;
    determining whether an operating mode of the HDD is a normal mode or a hybrid mode when the mode conversion flag is disabled;
    operating the HDD as the normal HDD when the operating mode of the HDD is the normal mode;
    determining whether the total number of defective blocks in the non-volatile cache is greater than a predetermined threshold when the operating mode of the HDD is the hybrid mode;
    operating the HDD as the hybrid HDD when the total number of the defective blocks is not greater than the threshold; and
    enabling the mode conversion flag and operating the HDD as the hybrid HDD when the total number of the defective blocks is greater than the threshold.

2. The method of claim 1 wherein the non-volatile cache comprises spare blocks which replace the defective blocks and the threshold is determined according to the total number of the spare blocks.

3. The method of claim 2 wherein the threshold is set to be the total number of the spare blocks.

4. The method of claim 2 wherein the threshold is set to a value obtained by subtracting a user specified margin from the total number of spare blocks.

5. The method of claim 1 wherein the step of determining whether the mode conversion flag is enabled is performed when the system having the HDD is powered on.

6. The method of claim 1 wherein operating the HDD as the normal HDD when the mode conversion flag is enabled further comprises:
    moving data stored in the non-volatile cache to the normal hard disk when the mode conversion flag is enabled;
    turning the hybrid mode off;
    disabling the mode conversion flag; and
    operating the HDD as the normal HDD.

7. The method of claim 6 wherein the mode conversion flag is enabled when the total number of defective blocks is greater than the threshold and is disabled when the operating mode of the HDD is converted from the hybrid mode to the normal mode.

8. The method of claim 1 wherein after operating the HDD as the normal HDD or operating the HDD as the hybrid HDD, the method further comprising powering off the system having the HDD.

9. The method of claim 8 wherein if the total number of the defective blocks is not greater than the threshold, the method further comprising;
    after operating the HDD as the hybrid HDD and before powering off the system having the HDD, determining again whether the total number of defective blocks in the non-volatile cache is greater than the threshold.

10. A method of converting a hard disk drive (HDD) from a hybrid HDD to a normal HDD, the HDD having a normal hard disk and a non-volatile cache, the method comprising:
    during an Nth power-on of a system having the HDD, if a mode conversion flag is disabled, if an operating mode of the HDD is a hybrid mode, and if the total number of defective blocks in the non-volatile cache is not greater than a predetermined threshold, then operating the HDD as the hybrid HDD and powering off the system;
    during an N+1th power-on of the system, if the mode conversion flag is disabled, if an operating mode of the HDD is the hybrid mode, and if the total number of defective blocks in the non-volatile cache is greater than the threshold, then enabling the mode conversion flag, operating the HDD as the hybrid HDD and powering off the system; and
    during an N+2th power-on of the system, if the mode conversion flag is enabled then turning the hybrid mode off and operating the HDD as the normal HDD.

11. The method of claim 10 wherein the turning off of the hybrid mode and operating the HDD as the normal HDD, further comprises:
    moving data stored in the non-volatile cache to the normal hard disk;
    turning the hybrid mode off;
    disabling the mode conversion flag; and
    operating the HDD as the normal HDD.

12. The method of claim 11 further comprising:
    after the operating of the HDD as the normal HDD, powering off the system having the HDD; and
    during an N+3th power-on of the system, if the mode conversion flag is disabled and the operating mode of the HDD is the normal mode, then operating the HDD as the normal HDD.

13. A method of converting a hard disk drive (HDD) from a hybrid HDD to a normal HDD, the HDD having a normal hard disk and a non-volatile cache, the method comprising:
    during an Nth power-on of a system having the HDD, if a mode conversion flag is disabled, if an operating mode of the HDD is a hybrid mode and if the total number of defective blocks in the non-volatile cache is not greater than the threshold, then operating the HDD as the hybrid HDD;

determining again whether the total number of the defective blocks is greater than the threshold, and if the total number of the defective blocks is greater than the threshold, enabling the mode conversion flag, operating the HDD as the hybrid HDD, and powering off the system; and during an N+1th power-on of the system, if the mode conversion flag is enabled, turning the hybrid mode off and operating the HDD as the normal HDD.

14. The method of claim 13 wherein the turning off of the hybrid mode and the operating of the HDD as the normal HDD, further comprises:

moving data stored in the non-volatile cache to the normal hard disk;
turning the hybrid mode off;
disabling the mode conversion flag; and
operating the HDD as the normal HDD.

15. The method of claim 14 further comprising:
after operating the HDD as the normal HDD, powering off the system; and
during an N+2th power-on of the system, if the mode conversion flag is disabled and the operating mode of the HDD is the normal mode, then operating the HDD as the normal HDD.

16. A method of converting a hard disk drive (HDD) from a hybrid HDD to a normal HDD, the HDD having a normal hard disk and a non-volatile cache, the method comprising:
determining whether a mode conversion flag is enabled during a power-on period;
if the mode conversion flag is enabled, operating the HDD as the normal HDD;
if the mode conversion flag is disabled, determining whether the total number of defective blocks in the non-volatile cache is greater than a predetermined threshold;
if the total number of the defective blocks is not greater than the threshold, operating the HDD as the hybrid HDD; and
if the total number of the defective blocks is greater than the threshold, enabling the mode conversion flag and operating the HDD as the hybrid HDD.

17. The method of claim 16 wherein the non-volatile cache comprises spare blocks replacing the defective blocks, and the threshold is set to the total number of the spare blocks or a value obtained by subtracting a user specified margin from the total number of the spare blocks.

18. The method of claim 16 wherein the step of determining whether the mode conversion flag is enabled, is performed when a system having the HDD is powered on.

19. The method of claim 16 wherein operating the HDD as the normal HDD further comprises:
if the mode conversion flag is enabled, determining whether the hybrid mode is turned off;
if the hybrid mode is not turned off, moving data stored in the non-volatile cache to the normal hard disk, turning the hybrid mode off, and operating the HDD as the normal HDD; and
if the hybrid mode is turned off, operating the HDD as the normal HDD.

20. The method of claim 19 wherein the mode conversion flag is enabled when the total number of the defective blocks is greater than the threshold, and maintains the enabled state even when an operating mode of the HDD is converted from the hybrid mode to a normal mode.

21. The method of claim 16 further comprising:
after the operating of the HDD as the normal HDD or the operating of the HDD as the hybrid HDD, powering off the system having the HDD.

22. The method of claim 21 wherein if the total number of the defective blocks is not greater than the threshold the method further comprises:
after operating the HDD as the hybrid HDD and before powering off the system having the HDD, determining again whether the total number of defective blocks is greater than the threshold.

23. A method of converting a hard disk drive (HDD) from a hybrid HDD to a normal HDD, the HDD having a normal hard disk and a non-volatile cache, the method comprising:
during an Nth power-on of a system having the HDD, if a mode conversion flag is disabled and the total number of defective blocks in the non-volatile cache is not greater than a predetermined threshold, then operating the HDD as the hybrid HDD and powering off the system;
during an N+1th power-on of the system, if the mode conversion flag is disabled and the total number of the defective blocks is greater than the threshold, then enabling the mode conversion flag, operating the HDD as the hybrid HDD, and powering off the system; and
during an N+2th power-on of the system, if the mode conversion flag is enabled and a hybrid operating mode is not turned off, then turning the hybrid mode off and operating the HDD as the normal HDD.

24. The method of claim 23 wherein, during an N+3th power-on of the system, if the mode conversion flag is enabled and the hybrid mode is turned off, then operating the HDD as the normal HDD.

* * * * *